March 26, 1935.  T. V. BUCKWALTER  1,995,837

AXLE CONSTRUCTION

Filed Oct. 11, 1933

INVENTOR
Tracy V. Buckwalter
by Carr & Carr Moovely
HIS ATTORNEYS.

Patented Mar. 26, 1935

1,995,837

UNITED STATES PATENT OFFICE 1,995,837

AXLE CONSTRUCTION

Tracy V. Buckwalter, Canton, Ohio, assignor to
The Timken Roller Bearing Company, Canton,
Ohio, a corporation of Ohio Application October 11, 1933, Serial No. 693,100

4 Claims. (Cl. 295—36)

This invention relates to railway car axles that are equipped with roller bearings. The principal object of the invention is to provide for the mounting of the bearing cone or inner raceway member on the axle without weakening the axle or unduly increasing the diameter of the axle to accommodate it. The invention consists principally in making the diameter of the axle underneath the bearing cone slightly larger than the diameter of the wheel seat, with the portion between them of still smaller diameter and receiving a snap ring which serves as a seat for a spacing member for positioning said bearing cone relative to the car wheel. It also consists in the arrangements and combinations of parts hereinafter described and claimed.

Figure 1:
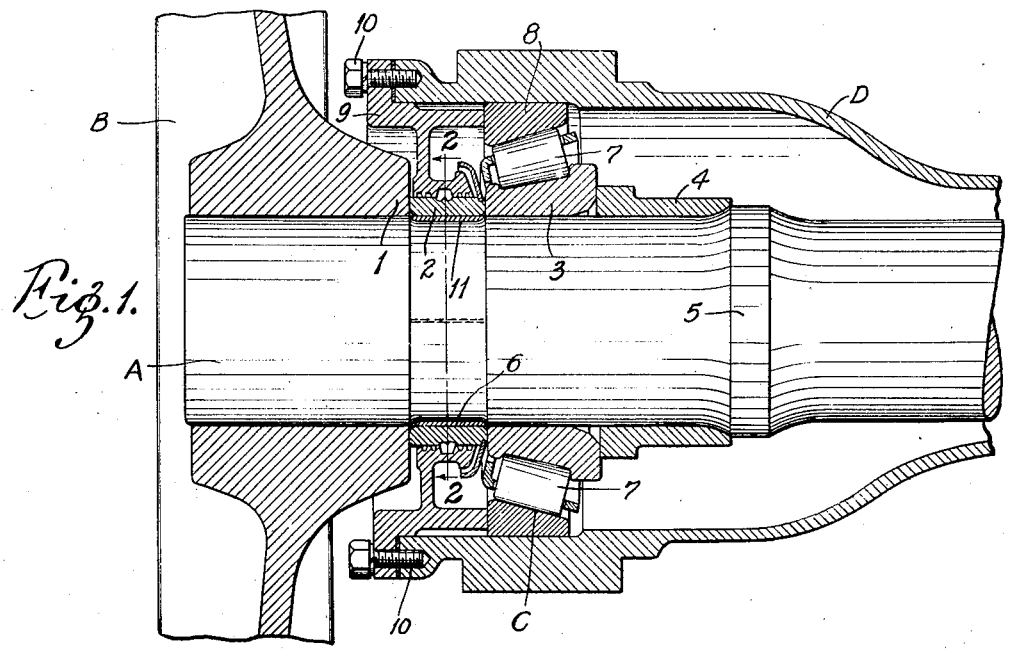
Figure 2:
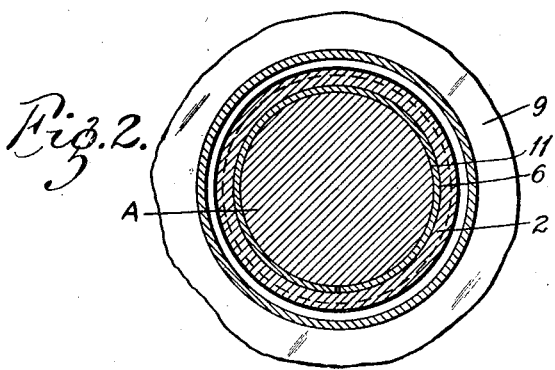

In the accompanying drawing wherein like symbols refer to like parts wherever they occur, Fig. 1 is a longitudinal sectional view of one-half of an axle and associated parts conforming to my invention;

Fig. 2 is a cross-section on the line 2—2 in Fig. 1.

The construction illustrated in the accompanying drawing comprises an axle A, a car wheel B mounted on each end thereof, a roller bearing C mounted on the axle at a distance inwardly from the inner end of the wheel hub 1, a spacing ring 2 interposed between the end of each wheel and the end of the adjacent cone or inner bearing member 3 of the roller bearing, a second spacing ring 4 interposed between the inner end of said inner bearing member and a rib or shoulder 5 provided therefor on the axle, and an enclosing housing D. Conical bearing rollers 7 are interposed between the bearing cone 3 and a cup or outer bearing member 8, which is held in a seat provided therefor in the axle housing by means of an end closure ring 9 that closely embraces the outer spacing ring 2 and is removably secured to the end of said housing by cap screws 10.

In practice, the inner spacing ring 4, the bearing cone 3, a split ring 6 hereinafter mentioned, and the outer spacing ring 2 are slipped over the end of the axle in the order mentioned, and the car wheel is then mounted on the end of the axle with a heavy press-fit. Heavy pressure is applied to the wheel to force it axially into proper position on the axle. In this operation, the hub 1 of the wheel pushes against the outer spacing ring 2 which, in turn, pushes against the bearing cone or inner raceway member 3, which, in turn, presses against the inner spacing ring 4 so that each piece moves the next until the inner spacing ring is brought up home against the rib or shoulder 5 provided therefor on the axle.

In order to facilitate assembly, the diameter of the axle underneath the bearing cone 3 is slightly greater than the diameter of the wheel seat. This enables the bearing cone to be slipped easily past the wheel seat and press-fitted on the axle. The portion of the axle between the end of the wheel seat and the adjacent end of the bearing cone is reduced in diameter, as at 11, being somewhat less than the diameter of the wheel seat and the ends of this reduced portion being formed with concave shoulders. This reduction of the diameter forms a wide shallow groove and has the effect of deconcentrating the stresses which would otherwise concentrate in the axle at the outer end of the cone and inner end of the wheel press-fitted therein and tend to fracture the axle at this point. In the groove or portion 11 of reduced diameter is mounted a wide cylindrical ring 6 which is split so that it can be readily slipped past the wheel seat, the outer surface of said ring being substantially flush with the surface of the portion of the axle underneath the bearing cone. Over this split or snap ring is press-fitted the outer spacing member 2.

By way of example, the axle may be made with a diameter of 6 9/16 inches at the wheel seat, 6 10/16 inches underneath the bearing cone and 6 6/16 inches between these places. Although the difference in diameter at the wheel seat and at the bearing cone is only 1/16 of an inch, the reduction of the diameter in the intervening region is sufficient to deconcentrate the stresses in the axle at the outer end of the cone and inner end of the wheel and substantially eliminate the danger of fracture at this point and thereby enables the axle to carry a heavier extraneous load than it would carry without such deconcentration of stresses.

Among the merits of the foregoing invention are the great simplicity and facility with which the parts can be assembled and the strength with which the parts are held together. Another important advantage is that the diameter of the axle under the bearing cone is only slightly larger than its diameter at the wheel seat whereby the weight of the axle and the diameter of the bearing cone are kept down and the roller bearing can be accommodated in a relatively small space.

What I claim is:—

1. A railway car axle comprising a wheel seat at the end thereof and a seat for an inner bearing member spaced inwardly from said wheel seat, the diameter of the second mentioned seat being slightly larger than the diameter of the wheel seat and the diameter of the intervening portion being less than that of the wheel seat.

2. A railway car axle comprising a wheel seat at the end thereof, a seat for an inner bearing member spaced inwardly from said wheel seat and a rib spaced inwardly from said second mentioned seat, the diameter of the second mentioned seat being slightly larger than the diameter of the wheel seat and the diameter of the intervening portion being less than that of the wheel seat.

3. The combination of an axle having a wheel seat at its outer end, a seat for an inner bearing member spaced inwardly from said wheel seat, a shallow groove between said seats, a roller bearing whose inner bearing member is mounted on said second mentioned seat, a car wheel mounted on the wheel seat and a spacing ring between the hub of the wheel and the adjacent end of the inner bearing member.

4. A railway car axle construction comprising an axle having a wheel seat at the end thereof, a slightly larger seat for an inner roller bearing member spaced inwardly from said wheel seat, a shallow groove between said seats, and a rib spaced inwardly from said second mentioned seat, a wheel mounted on said wheel seat, an inner roller bearing member mounted on the seat therefor, a spacing ring between said inner bearing member and said rib, a split ring in said groove, and a spacing ring mounted on said ring between said wheel and said inner bearing member.

TRACY V. BUCKWALTER.